L. DEBAKER.
CUTTING ATTACHMENT FOR GRAIN SEPARATORS.
APPLICATION FILED OCT. 28, 1915.
1,172,114.
Patented Feb. 15, 1916.
2 SHEETS—SHEET 1.
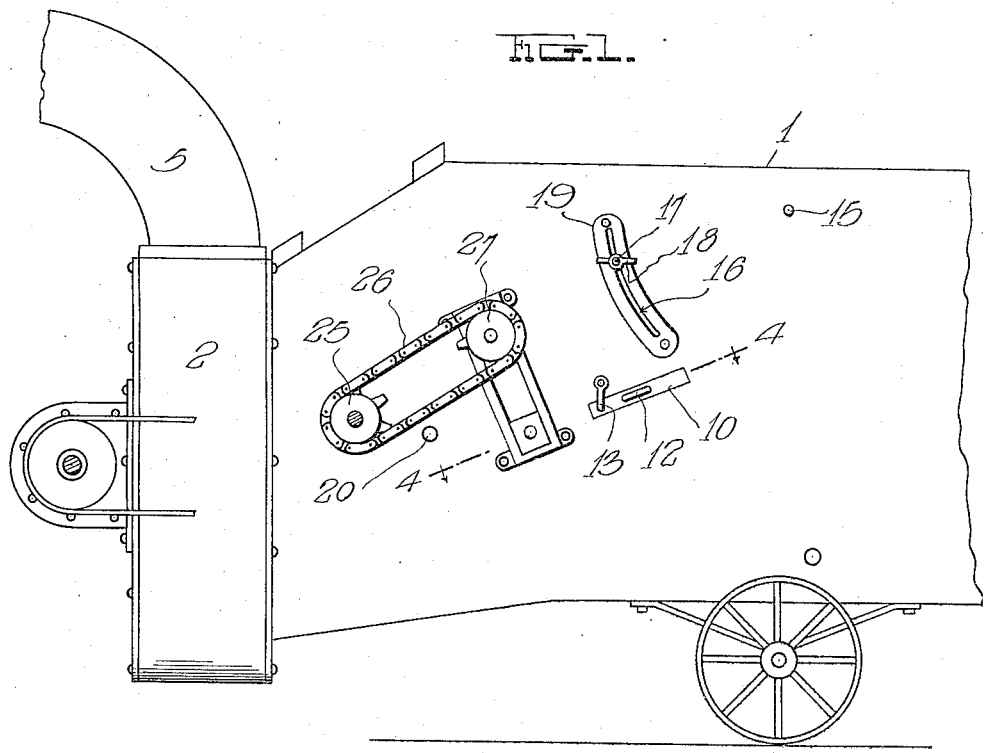
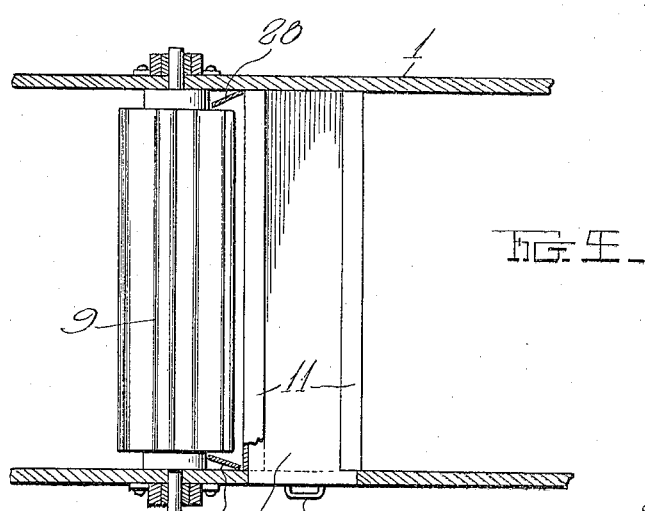
Witnesses
H. Woodard
Edwin B. Hunt
Inventor
Louis Debaker
By H. B. Willson & Co.
Attorneys
THE COLUMBIA PLANOGRAPH CO., WASHINGTON, D. C.

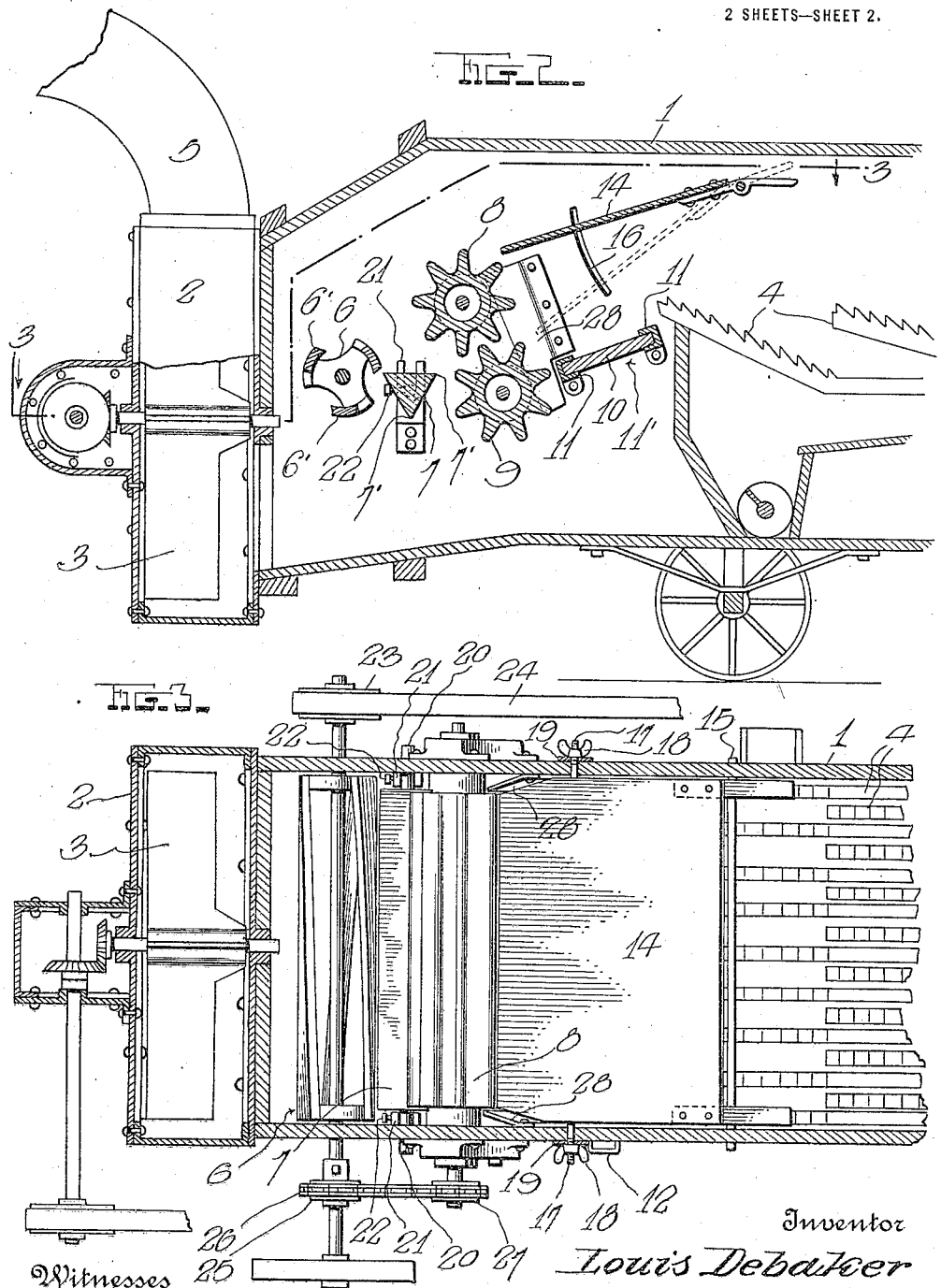

UNITED STATES PATENT OFFICE.

LOUIS DEBAKER, OF LUXEMBOURG, WISCONSIN.

CUTTING ATTACHMENT FOR GRAIN-SEPARATORS.

1,172,114.  Specification of Letters Patent.  Patented Feb. 15, 1916.

Application filed October 28, 1915. Serial No. 58,432.

*To all whom it may concern:*

Be it known that I, LOUIS DEBAKER, a citizen of the United States, residing at Luxembourg, in the county of Kewaunee and State of Wisconsin, have invented certain new and useful Improvements in Cutting Attachments for Grain-Separators; and I do declare the following to be a full, clear, and exact description of the invention, such as will enable others skilled in the art to which it appertains to make and use the same.

This invention relates to improvements in threshing machines particularly the straw cutting attachment therefor and its associated parts.

The principal object is to provide an improved means whereby the straw may either be cut in the usual manner or delivered to the stack without being cut.

With this general object in view, my invention resides in the novel features of construction, combination and arrangement of parts which will hereinafter be more particularly described and claimed.

In the accompanying drawings: Figure 1 represents a side elevation of a portion of the grain separator having my improvements applied thereto; Fig. 2 is a central vertical section showing the interior arrangement; Fig. 3 is a horizontal section taken on the line 3—3 of Fig. 2; Fig. 4 is a similar view illustrating more particularly the removable platform, and is taken substantially on the line 4—4 of Fig. 1.

I have shown my invention applied to an ordinary form of grain separator comprising the usual housing 1 having at one end a fan casing 2 in which the blower fan 3 is rotatably mounted, the threshed straw being delivered to said fan by the straw carrier here shown in the form of the walking rakes 4. As is usual in this type of machine, the threshed straw is sucked into the fan casing by the rotary fan and then blown through the chute 5 to the stack. Generally the straw before reaching the blower is chopped into short lengths, but when the machine is provided with a cutting attachment for chopping the straw, no means are provided whereby the straw may be delivered from the carrier to the blower without being cut. My invention consists in providing such means in conjunction with the usual rotary cutter 6 which coacts with the stationary cutter bar 7. It is generally necessary to provide a feeding mechanism to supply the straw to the cutter, therefore, I have shown the toothed rollers 8 and 9 which are adapted to intermesh as shown in Fig. 2. The straw passes from the carrier 4 onto a removable platform 10 which comprises the principal portion of my invention. From this platform it passes between the rollers 8 and 9 which feed it to the cutter. This removable platform 10 is shown as mounted in slides 11 secured to the side walls of the thresher housing 1 in any preferred manner. These slides 11 are preferably formed of channel-shaped bars arranged with their grooves toward each other to receive and guide said platform, and are secured by their opposite ends to the side walls of the thresher. One end of the platform extends through one of said side walls as shown in Fig. 1 where it is provided with a handle 12 by which it may be withdrawn, a gravity catch 13 being used for normally holding it in operative position. It is obvious that when this platform is removed, the straw from the carrier 4 will fall through the opening 11' between the guides 11 and onto the floor of the housing 1 from which it passes in an uncut condition to the blower.

In order to facilitate the direction of movement of the straw from the carrier, I provide an adjustable deflector 14 hinged at 15 between the side walls of the housing 1, said deflector being normally positioned as shown in full lines in Fig. 2, the cutting attachment being operative. When, however, it is desired not to cut the straw, the deflector is dropped into the dotted line position in the above mentioned figure and the straw will be directed downwardly through the opening 11' when the platform is removed. The side walls of the housing are slotted as shown at 16 intermediate the ends of the deflector 14 and are adapted to receive outwardly projecting threaded studs 17 which are carried by the outer edges of said deflector. The threaded ends of said studs 17 are provided with clamping nuts 18, which, when tightened, bear against the plates 19 slotted to correspond with the slots 16. It is evident that by tightening the clamping nuts 18, the deflector 14 may be positioned at any point between the ends of the slots 16.

While any preferred form of cutting attachment may be used in connection with the above described details, that shown comprises the rotary cutter 6 having three cutting blades 6' formed thereon. The cutter bar is shown as of triangular formation having a cutting edge 7' at each of the angles of said triangle. Rounded spindles 20 are formed on the opposite ends of said cutter bar and are adapted to be disposed in the forked bearings 21, the said bar being held in operative position by the set screws 22 passing through the forks 21 and into the spindles 20. This arrangement permits the cutter bar to be turned to any one of its three cutting edges and readily allows one cutting edge to be substituted for another when that becomes dull. The spindles on the rotary cutter 6 extend through the bearings in the side walls of the housing, one of said spindles being provided with a pulley 23 adapted to be driven by the belt 24. The opposite spindle has keyed thereon a sprocket wheel 25 around which passes a chain 26 which also extends around a similar wheel 27 keyed to the spindle of the toothed roller 8. This arrangement of driving connections between the cutter and the feed rollers causes said rollers to be operated in a direction to feed the straw to the cutting attachment whenever said rotary cutter is operated. It is obvious that the lower feed roller is caused to rotate upon rotation of the upper roller 8 because of the intermeshing teeth thereon.

An additional feature of my invention is the guard 28 best disclosed in Figs. 2 and 3, which prevents any of the straw about to be cut from becoming entangled in the bearings of the feed rollers 8 and 9. Without this guard it is frequently necessary to stop the operation of the thresher and clean the bearings of straw which has accumulated therearound.

From the foregoing description of the construction and operation of my improved attachment, it is obvious that while they are extremely simple, they are of the utmost importance, and will be found to be indispensable to practically all users of threshing machines and grain separators.

I claim:

1. In combination with a straw carrier, a straw cutter, a removable platform between said carrier and cutter, and a deflector pivoted above said platform and operating between said carrier and cutter.

2. In combination with a straw carrier, a cutter, feeding means therefor, and a removable platform located over the passageway between said carrier and the said cutter feeding means.

3. In combination with a straw carrier, a cutter, feeding means therefor, a removable platform located over the passageway between said carrier and said cutter feeding means, and a deflector pivoted above said platform and operating between said carrier and the said cutter feeding means.

4. In combination with a straw carrier, a straw cutter, a pair of spaced apart channel-shaped guide bars between said carrier and cutter, a platform slidable therein, and a deflector pivoted above said platform and operating between said carrier and cutter.

5. In combination with a straw carrier, a straw cutter, a removable platform between said carrier and cutter, and a deflector above said platform and movable into position between said carrier and cutter to deflect the straw downwardly.

In testimony whereof I have hereunto set my hand in presence of two subscribing witnesses.

LOUIS DEBAKER.

Witnesses:
  CLEM DePAS,
  GOULD PATIER.

Copies of this patent may be obtained for five cents each, by addressing the "Commissioner of Patents, Washington, D. C."